(12) United States Patent
Meyer et al.

(10) Patent No.: US 9,885,376 B1
(45) Date of Patent: Feb. 6, 2018

(54) ROTARY CONNECTOR DEVICES, CONNECTOR ASSEMBLIES AND METHOD OF USE

(71) Applicant: Brunswick Corporation, Lake Forest, IL (US)

(72) Inventors: Mathew R. Meyer, Hanover, MN (US); Dennis Whaley, Otsego, MN (US)

(73) Assignee: Brunswick Corporation, Mettawa, IL (US)

( * ) Notice: Subject to any disclaimer, the term of this patent is extended or adjusted under 35 U.S.C. 154(b) by 321 days.

(21) Appl. No.: 14/664,302

(22) Filed: Mar. 20, 2015

(51) Int. Cl.
  *F16B 21/00* (2006.01)
  *F16B 12/42* (2006.01)
  *F16B 9/02* (2006.01)
  *F16B 37/04* (2006.01)

(52) U.S. Cl.
  CPC .............. *F16B 12/42* (2013.01); *F16B 9/026* (2013.01); *F16B 37/047* (2013.01)

(58) Field of Classification Search
  CPC ......... F16B 12/42; F16B 9/026; F16B 37/047
  USPC .................. 411/173–175, 553, 85, 104, 349
  See application file for complete search history.

(56) References Cited

U.S. PATENT DOCUMENTS

| | | | |
|---|---|---|---|
| 2,315,359 A | 3/1943 | Tinnerman | |
| 2,346,712 A | 4/1944 | Tinnerman | |
| 3,493,025 A * | 2/1970 | Van Huffel | F16B 37/046 411/103 |
| 4,460,299 A * | 7/1984 | Kowalski | F16B 37/045 411/104 |
| 4,645,393 A * | 2/1987 | Pletcher | F16B 37/046 403/388 |
| 5,000,634 A | 3/1991 | Ducote | |
| 5,154,385 A * | 10/1992 | Lindberg | A47B 57/562 248/225.11 |
| 5,176,482 A | 1/1993 | Reinl | |
| 5,199,836 A * | 4/1993 | Gogarty | F16B 37/045 411/104 |
| 5,375,798 A * | 12/1994 | Hungerford, Jr. | F16L 3/24 248/58 |
| 5,645,384 A | 7/1997 | Wright et al. | |
| 5,678,939 A | 10/1997 | Ross | |
| 5,820,322 A * | 10/1998 | Hermann | F16B 37/045 411/174 |

(Continued)

FOREIGN PATENT DOCUMENTS

DE   10139023   4/2003

*Primary Examiner* — Gary W Estremsky
(74) *Attorney, Agent, or Firm* — Andrus Intellectual Property Law, LLP

(57) ABSTRACT

A connector assembly comprises a base part that defines a throughhole receiving a bolt and a connector device having a rear portion that fits through the throughhole in the base part, and a front portion that does not fit through the throughhole in the base part. The rear portion of the connector device defines a bolt hole for engaging with a bolt extending through the throughhole in the base part. The front portion of the connector device defines an access opening aligned with the bolt hole in the rear portion. The rear portion is configured with an engagement surface structure engaged with a forming wall structure of the throughhole in the base part upon movement of the connector device relative to the throughhole.

19 Claims, 6 Drawing Sheets

(56) References Cited

U.S. PATENT DOCUMENTS

| | | | |
|---|---|---|---|
| 6,267,711 B1 * | 7/2001 | Hinds | A63B 1/00 |
| | | | 482/121 |
| 6,733,221 B2 * | 5/2004 | Linger | F16B 37/045 |
| | | | 411/104 |
| 7,338,241 B2 * | 3/2008 | Bond | F16B 37/044 |
| | | | 411/172 |
| 7,608,022 B2 | 10/2009 | Lull et al. | |
| 7,892,155 B2 | 2/2011 | Pearson et al. | |
| 8,353,649 B2 * | 1/2013 | Csik | F16B 37/045 |
| | | | 411/108 |
| 8,807,898 B2 | 8/2014 | Nelson et al. | |
| 2002/0071735 A1 * | 6/2002 | Dinh | F16B 37/046 |
| | | | 411/85 |
| 2004/0096290 A1 | 5/2004 | Birnbaum | |
| 2007/0054785 A1 | 3/2007 | Drechsler | |
| 2011/0296773 A1 | 12/2011 | Kellerman | |

* cited by examiner

ROTARY CONNECTOR DEVICES, CONNECTOR ASSEMBLIES AND METHOD OF USE

FIELD AND BACKGROUND

The present disclosure relates to connector devices and assemblies. The illustrated embodiments relate to exercise equipment and connector devices and assemblies for connecting components of exercise equipment. This disclosure is applicable to other types of apparatus in addition to exercise equipment.

U.S. Pat. No. 8,807,898 which is herein incorporated by reference in entirety, discloses a connector assembly comprising a base part that defines a throughhole for receiving a bolt and also defines an aperture for receiving a device having a first end that fits through the aperture in the base part and a second end that does not fit through the aperture in the base part. The first end of the device defines a bolt hole for engaging with a bolt extending through the throughhole in the base part. The second end of the device comprises opposing outer surfaces that engage the base part and thereby prevent the device from passing completely through the aperture, and also align the bolt hole in the device with the throughhole in the base part when the first end of the device is inserted into the aperture.

SUMMARY

The summary is provided to introduce a selection of concepts that are further described below in the detailed description. This summary is not intended to identify key or essential features of the claimed subject matter, nor is it intended to be used as an aid in limiting the scope of the claimed subject matter.

In some examples, connector assemblies comprise a connector device and a base part that defines a throughhole having a forming wall structure for receiving a bolt and for receiving the connector device. The connector device has a rear portion that fits through the throughhole in the base part, and a front portion which does not fit through the throughhole in the base part. The rear portion of the connector device defines a bolt hole for engaging with the bolt extending through the throughhole in the base part, and the front portion of the connector device defines an access opening aligned with the bolt hole in the rear portion for receiving the bolt. The rear portion is configured with engagement surface structure aligned with and engaged in abutting relationship with the forming wall structure upon movement of the connector device relative to the throughhole in the base part.

In other examples, connector devices are provided for connecting an element to a base pan via a bolt. The connector devices each comprise a body having a width extending in a lateral direction, a height extending in a vertical direction perpendicular to the lateral direction, and a depth extending in a transverse direction perpendicular to the lateral direction and perpendicular to the vertical direction. The body includes a rear portion integrally joined to a front portion. The rear portion is configured to fit through a throughhole defined by forming wall structure and formed in the base pan, and the front portion is configured with a rear face for engaging an outer surface of the base part lying outside the throughhole. The rear portion extends between upper and lower surfaces in the lateral direction, between first and second side surfaces in the vertical direction, and between front and rear walls in the transverse direction. The rear portion has a core portion extending between the front wall and the rear face of the front portion. The core portion is formed with engagement surface structure for engaging the forming wall structure of the throughhole to retain the body relative to the base part when the rear portion is inserted through the throughhole and the body is rotated relative to the base part. The body is formed with a hole extending completely through the front portion and the rear portion in the transverse direction in alignment with the throughhole for receiving the bolt and engaging the bolt in a threaded connection within the rear portion.

In further examples, there is disclosed a method of connecting an element via a bolt to a base part having throughhole formed in a mounting face thereof and defined by forming wall structure. The method includes the steps of a) providing a connector device having a rear portion that fits through the throughhole in the base part, and a front portion which does not fit through the throughhole and engages an outer surface of the mounting face lying outside the throughhole, wherein the rear portion defines a bolt hole and the front portion defines an access opening aligned with the bolt hole, the bolt hole and the access opening being aligned with the throughhole, and wherein the rear portion is configured with engagement surface structure; b) rotating the connector device when the rear portion is inserted through the throughhole such that the engagement surface structure is brought into abutting relationship with the forming wall structure of the throughhole to prevent further rotation of the connector device relative to the base part; and c) inserting the bolt through the element and the access opening and turning the bolt into threaded connection with the bolt hole to secure the element to the base part.

BRIEF DESCRIPTION OF THE DRAWING

Examples of connector devices and assemblies are described with reference to the following figures. The same numbers are used throughout the figures to reference like features and components.

DETAILED DESCRIPTION OF THE DRAWINGS

Figure 1:
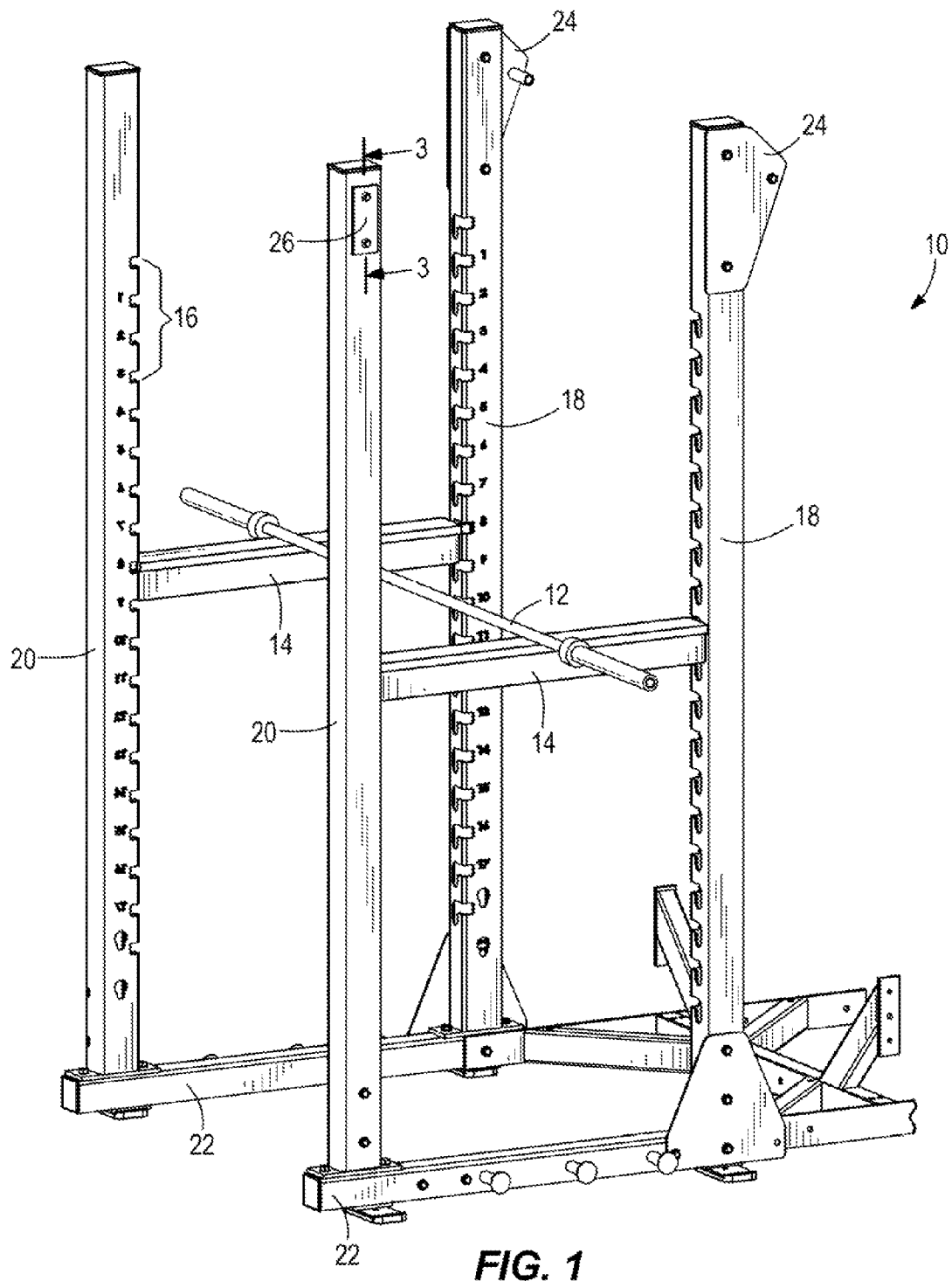
FIG. 1 is a perspective view of exercise equipment having a connector assembly according to the present disclosure.

In the present description, certain terms have been used for brevity, clearness, and understanding. No unnecessary limitations are to be inferred therefrom beyond the requirement of the prior art because such terms are used for descriptive purposes only and are intended to be broadly construed. The different devices and assemblies described herein may be used alone or in combination with other devices and/or assemblies. Various equivalents, alternatives and modifications are possible within the scope of the appended claims FIG. 1 depicts exercise equipment 10 including among other things, a weight rack 10 and a weight bar 12. The weight rack 10 and the weight bar 12 are exemplary and provide only one of many examples of uses for the present invention. The present invention is applicable to other apparatuses and/or structural assemblies in addition to the weight rack 10 shown in FIG. 1. The weight bar 12 is shown supported on the weight rack 10 via a pair of cross support members 14 which are releasably fixable to different vertical locations (e.g. 16) to thereby allow a user to select the vertical height at which the weight bar 12 is supported above the ground. The cross support members 14 are attached to respective front and rear support columns 18, 20 which vertically extend above and are supported by base frame members 22. First auxiliary support members 24 are attached to support columns 18 for attachment of additional exercise apparatus (not shown) such as, for example, chin up assemblies. The auxiliary support members 24 are connected to the support columns 18 such as by connector assemblies as disclosed in U.S. Pat. No. 8,807,898. In the example shown, a second auxiliary support member 26 in the form of a plate is attached to support column 20 for further attachment of additional exercise apparatus (not shown) by a connector assembly according to the present disclosure. Again, the weight rack 10 shown in the figures is exemplary, and the present invention can be used to connect structural members in other types of structural apparatus besides the exercise equipment shown in FIG. 1.

Figure 2:
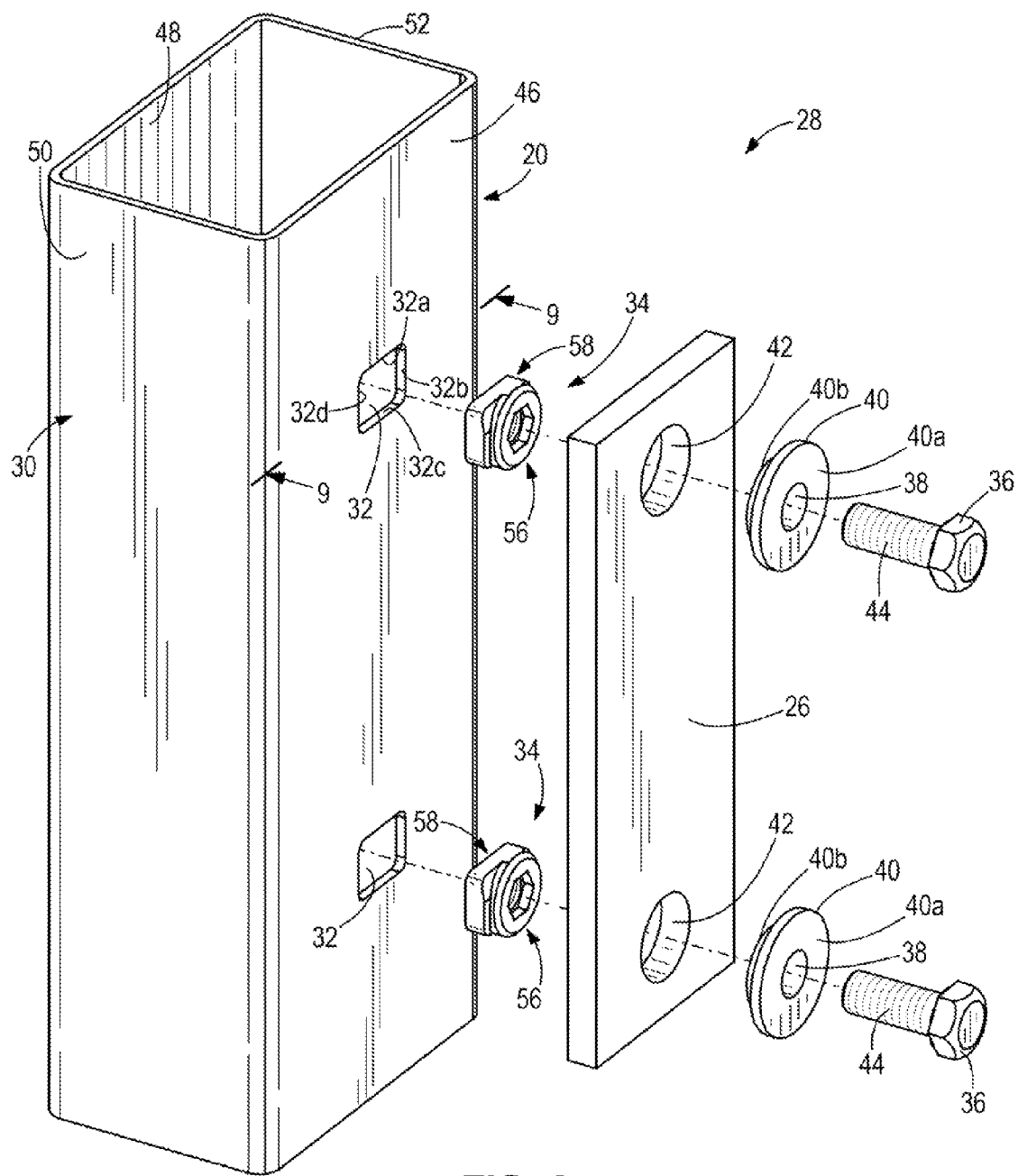
FIG. 2 is a partially exploded view of the connector assembly.

FIG. 2 depicts a connector assembly 28 according to the present disclosure including a base part 30 which in the exemplary embodiment is a rectangular tube that is part of the rear support column 20 shown in FIG. 1. It should be noted that the support column 20 may have a different cross sectional configuration other than the rectangular tube shown. The connector assembly 28, in this example, connects the support column 20 and the auxiliary support member 26. The configuration and function of the base part 30 and member 26 can vary. In other examples, the base part 30 can form part of the base frame member 22 or other portions of the weight rack 10. The base part 30 defines at least one throughhole 32 shaped and sized for receiving and retaining a connector device 34 relative to forming walls 32a, 32b, 32c. 32d of the throughhole 32. A bolt 36 extends through a throughhole 38 formed in a washer 40 and then passes through an opening 42 configured through the support member 26. In the example shown, the washer 40 has a circular front portion 40a designed to overlie the opening 42 and a circular rear portion 40b configured with a smaller diameter than the diameter of the front portion 40a such that the rear portion 40b is received by the walls forming the opening 42. According to the present disclosure, the connector device 34 receives a threaded end 44 of the bolt 36 to thereby connect the support member 26 and the base part 30.

Figure 3:
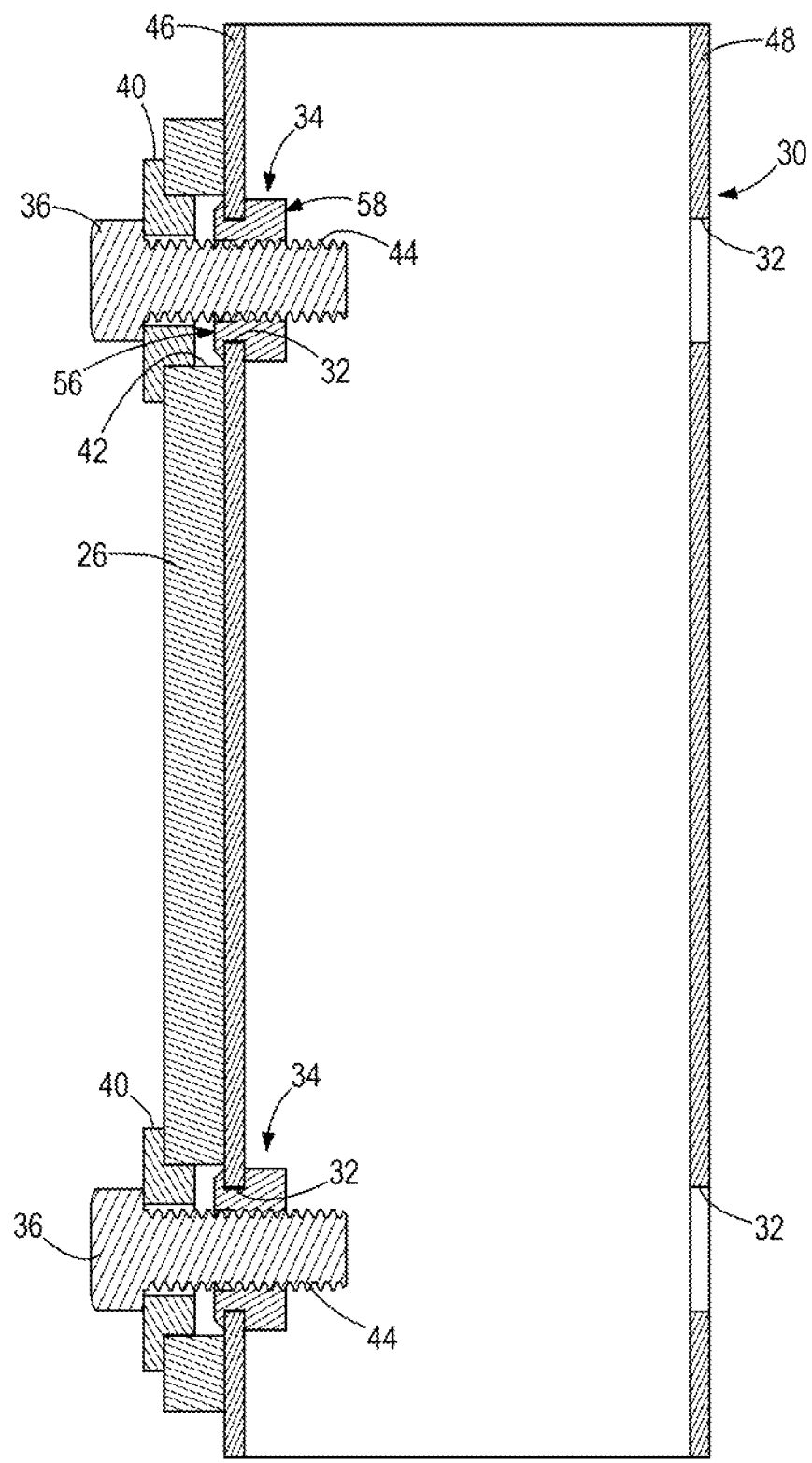
FIG. 3 is a sectional view of the connector assembly taken on line 3-3 of FIG. 1.

In the example shown in FIG. 2, the connector assembly 28 includes a pair of identical spaced apart throughholes 32, each of which receives one of the connector devices 34 which is coupled to one of the bolts 36, washers 40, and the supporting member 26 as described above. The throughholes 32 are formed through a sidewall and mounting face 46 of the base part 30. As seen in FIG. 3, an additional pair of throughholes 32 are formed in an opposing sidewall and mounting face 48 of the base part 30 to permit further connection of an auxiliary support member to an opposite side of the support column 20. If desired, throughhole 32 could also be formed on opposing end walls and mounting faces 50, 52 of the base part 30. It should be appreciated that each throughhole 32 is located between and away from the adjacent corners of the base part 30 so as not to weaken the structural integrity thereof.

FIGS. 4-8 depict the connector device 34 in further detail. The device 34 has a body 54 integrally formed with a front portion 56 and a rear portion 58. The body 54 has a width w extending in a lateral direction W, a height h extending in a vertical direction V perpendicular to the lateral direction W and a depth d extending in a transverse direction D which is perpendicular to the lateral direction W and the vertical direction V. The front portion 56 is sized and shaped so that it does not fit through the throughhole 32 in the base part 30. The rear portion 58 is sized and shaped to fit through the throughhole 32 in the base part 30.

The front portion 56 is formed with a circular shape, and includes a circular planar front face 60 having a first diameter, and a circular planar rear face 62 (FIGS. 7-8) having a diameter which is larger than the diameter of the first face 60. The front face 60 and the rear face 62 are connected by a peripheral rim 64 which diverges in the transverse direction D from the front of face 60 towards the rear face 62. A central area of the front portion 56 is formed completely therethrough with an unthreaded access opening 66. In the example shown, the access opening 66 has a hexhead configuration defined by six forming walls 68 which are designed to receive a complementary-shaped hexhead of a driving tool (not shown) used during installation of the connector device 34. However, it should be understood that the access opening 66 may be otherwise configured to matingly receive a driving tool for installation of the connector device 34 as will be explained below.

Figure 4:
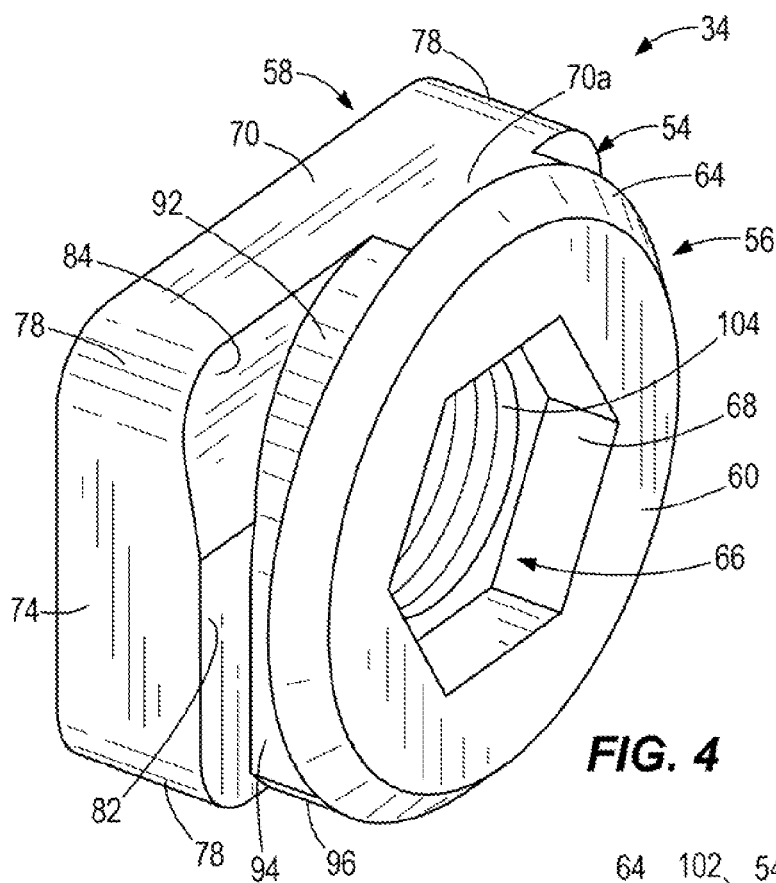
FIG. 4 is a left front perspective view of a rotary connector device for connecting an element to a base part via a bolt and a washer.
Figure 5:
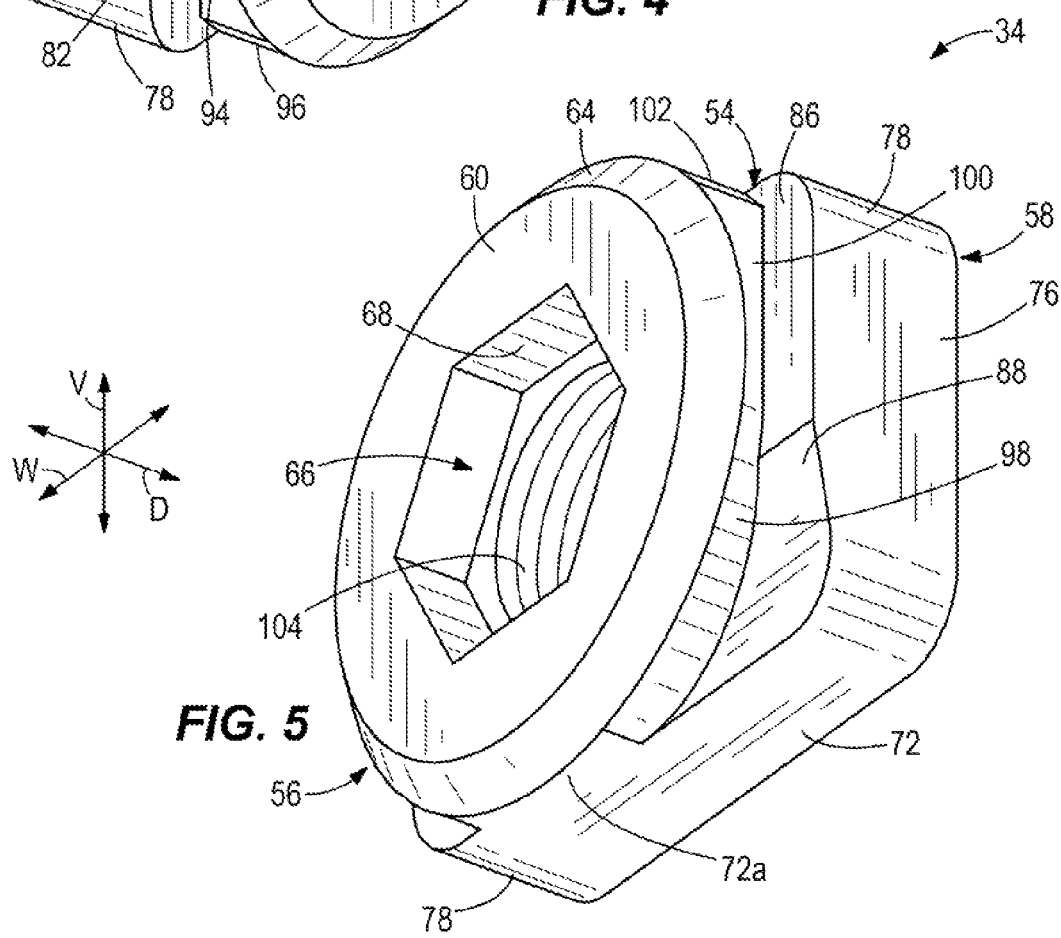
FIG. 5 is a right front perspective view of the connector device shown in FIG. 4.
Figure 7:
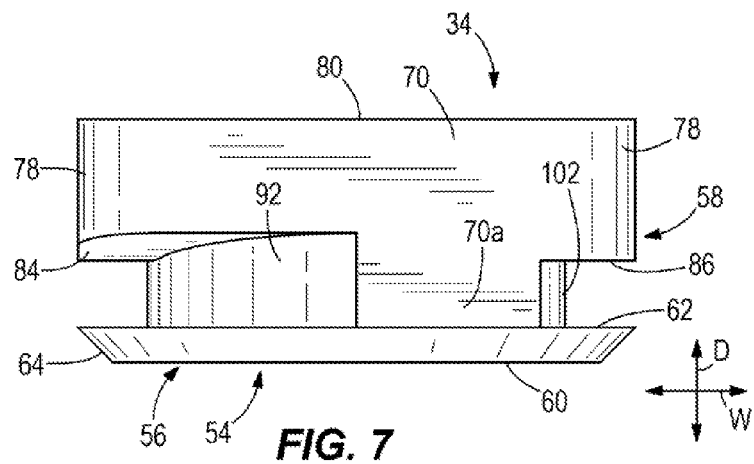
FIG. 7 is a top view of the connector device shown in FIG. 6.
Figure 8:
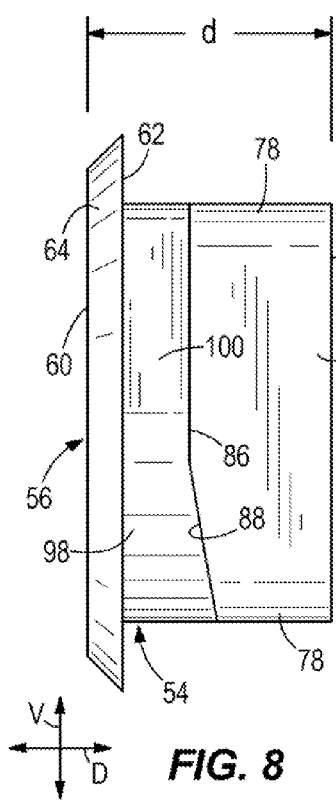
FIG. 8 is a right side view of the connector device shown in FIG. 6.
Figure 6:
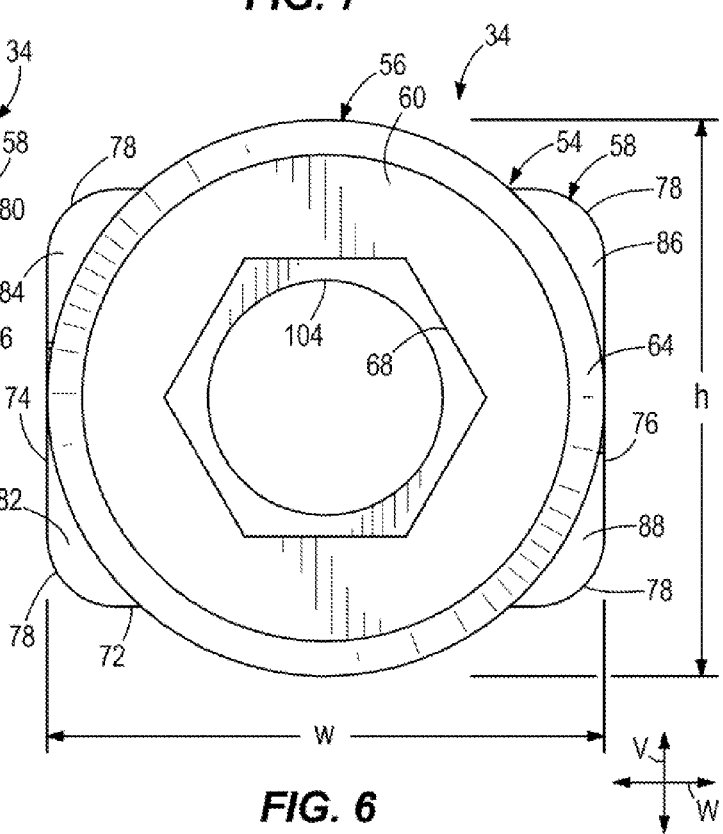
FIG. 6 is a front view of the connector device shown in FIGS. 4 and 5.

The rear portion 58 is constructed with various surfaces which form a clearance space behind the front portion 56, and are designed to lie behind and within the forming walls 32a, 32b, 32c, 32d of the throughhole 32. The rear portion 58 has a planar upper surface 70 and a planar lower surface 72, both of which extend laterally in the direction W. The rear portion 58 also includes a first planar side surface 74 and a second planar side surface 76 extending in the vertical direction V. The upper and lower surfaces 70, 72 and the side surfaces 74, 76 are connected by rounded corners 78. The upper and lower surfaces 70, 72, the side surfaces 74, 76 and the rounded corners 78 define a generally rectangular periphery which is sized slightly smaller than the size of the throughhole 32 formed in the base part 30. As best seen in FIGS. 4, 5 and 7, the upper planar surface 70 includes an upper planar segment 70a which is connected to an upper end of the rear face 62 of the front portion 56. The lower planar surface 72 includes a lower planar segment 72a which is connected to a lower end of the rear face 62 of the front portion 56. The rear portion 58 has a planar rear wall 80 (FIGS. 7-8) which lies parallel to the rear face 62 of the front portion 56. A left side front wall of the rear portion 58 further includes a planar lower front surface 82, and a ramped upper front surface 84 which extends upwardly in the vertical direction V and rearwardly in the transverse direction D. A right side front wall of the rear portion 58 includes a planar upper front surface 86, and a ramped lower front surface 88 which extends downwardly in the vertical direction V and rearwardly in the transverse direction D.

Together, the planar front surfaces 82, 86 and the ramped front surfaces 84, 88 define a front wall of the rear portion 58.

Figure 9:
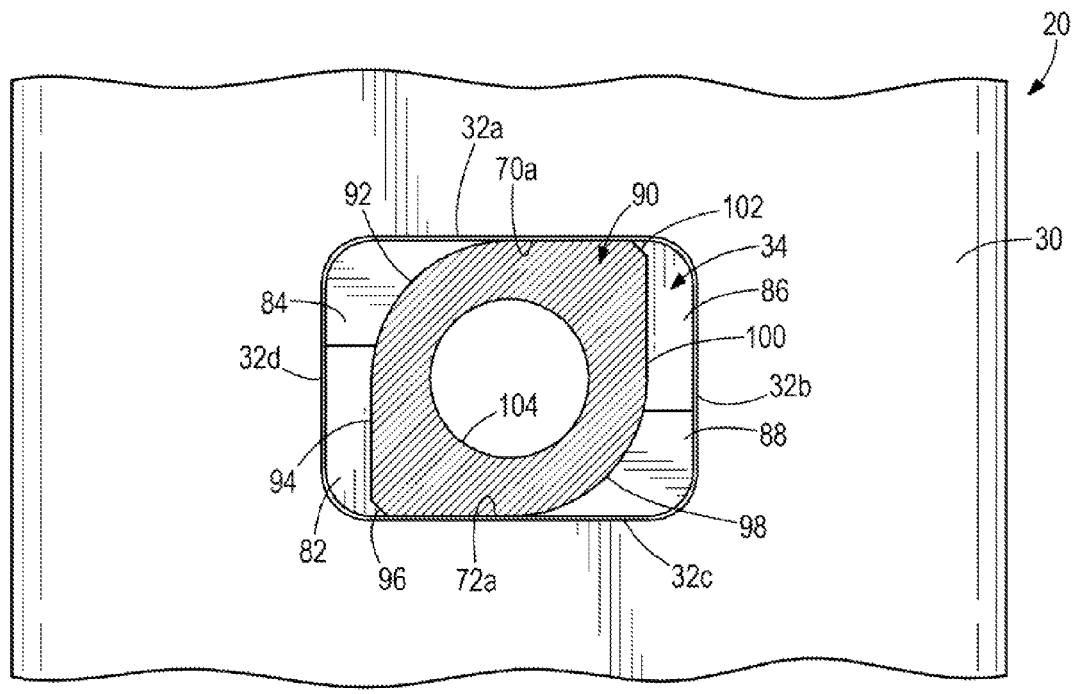
FIG. 9 is a partial sectional view taken on line 9-9 of FIG. 2 showing insertion of the connector device into the base part.
Figure 10:
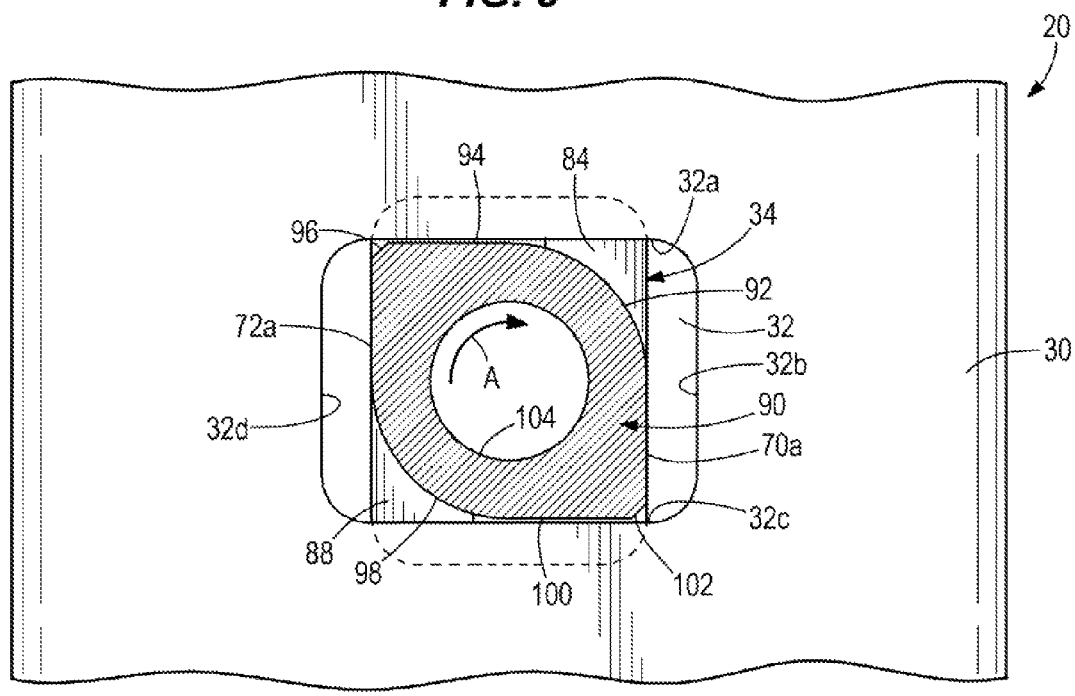
FIG. 10 is a view similar to FIG. 9 showing a rotary orientation of the connector device in the base part.

Further referring to FIGS. 9 and 10, the rear portion 58 additionally includes a core portion 90) which extends in the transverse direction D between the front surfaces 82, 84, 86, 88 and the rear face 62 of the front portion 56. As seen in FIG. 4, the core portion 90 has a first lobe 92 which extends from the upper planar segment 70a and merges smoothly into an outwardly facing first planar engagement surface 94 having a first beveled edge 96 joined to the lower planar segment 72a. The first lobe 92 has a width extending in the transverse direction D which gradually decreases as it extends along the ramped front surface 84 towards the first planar engagement surface 94.

As seen in FIG. 5, the core portion 90 also has an outwardly facing second lobe 98 which extends from the lower planar segment 72a and uniformly transitions with an outwardly facing second planar engagement surface 100 having a beveled edge 102 joined to the upper planar segment 70a. The second lobe 98 has a width extending in the transverse direction D which gradually decreases as it extends along the ramped front surface 88 towards the second planar engagement surface 100.

As seen in FIGS. 4 and 5, the rear portion 58 of the connector device 34 is formed therethrough with an internally threaded throughhole 104 which is aligned with the throughhole 66 formed through the front portion 56.

In use, the hexhead of an installation tool is first inserted into mating engagement with the walls 68 of the access opening 66 formed in the front portion 56 of the connector device 34. The rear portion 58 of the connector device 34 is then inserted into the throughhole 32 as shown in FIG. 9 until the rear face 62 of the front portion 56 contacts an outer surface of the base part 30 extending outside the throughhole 32. Next, the tool is turned in the direction of arrow A to rotate the entire connector device 34, 90 degrees about a central axis of the throughhole 32 extending in the transverse direction D, as shown in FIG. 10. During this rotary motion, the first lobe 92 moves along wall 32a as the lower front surface 82 and the ramped front surface 84 move along an inner surface of the base part 30 above wall 32a. Simultaneously, the second lobe 98 moves along wall 32c as the upper front surface 86 and the ramped front surface 88 move along the inner surface of base part 30 below wall 32c. Such rotary movement brings first engagement surface 94 into abutting contact with wall 32a, and second engagement surface 100 into abutting contact with wall 32c. At this point, the connector device 34 can no longer be rotated in the direction of arrow A, and is retained in the base part 30 relative to at least the walls 32a, 32c of the throughhole 32.

Thereafter, the installation tool is removed and, as shown in FIGS. 2 and 3, the bolt 36 is fed through the throughhole 38 in the washer 40 and the opening 42 formed in the support member 26, and has its threaded portion 44 turned into engagement in a threaded connection with throughhole 104 formed at the rear portion 58 of the connector device 34. Accordingly, the support member 26 can be conveniently and securely attached to the base part 30 without the need to extend the threaded shaft 44 of the bolt 36 completely through the base part 30. If desired, the connector assembly 28 may be quickly disassembled by simply reversing the above process.

As should be recognized by those skilled in the art, the present disclosure provides a connector assembly that can be mass produced, and eliminates the need for tools to hold the connector device in place during connection of the support member to the base part. In comparison with prior art arrangements, the connector assembly of the present disclosure requires less laser time in forming a throughhole in a mounting face of a base part away from the corners thereof so as to maintain the strength and aesthetic appearance of the base part. In addition, the connector device can be formed so that it can be used on multiple gauge thicknesses of the base part. The connector device can be easily replaced in the field if it becomes lost or damaged, and is economical to manufacture. The examples set forth herein advantageously provide modular attachments that are independent of each other, and provide a replaceable threaded connection which is efficient and easy to use.

Although only a few examples have been described in detail above, those having ordinary skill in the art will readily appreciate that many modifications are possible in examples without materially departing from the invention. All such modifications are intended to be included within the scope of this disclosure as defined in the claims.

What is claimed is:

1. A connector assembly comprising:
   a connector device; and
   a base part that defines a throughhole having a forming wall structure for receiving a bolt and for receiving the connector device;
   the connector device having a rear portion that fits through the throughhole in the base part, and a front portion which does not fit through the throughhole in the base part;
   wherein the rear portion of the connector device defines a bolt hole for engaging with the bolt extending through the throughhole in the base part, and the front portion of the connector device defines an access opening aligned with the bolt hole in the rear portion for receiving the bolt;
   wherein the rear portion is configured with engagement surface structure aligned with and engaged in abutting relationship with the forming wall structure upon movement of the connector device relative to the throughhole in the base part;
   wherein the rear portion is constructed with a plurality of surfaces that define a clearance space behind the front portion, the surfaces being configured to lie behind and within the forming wall structure of the throughhole formed in the base part; and
   wherein the plurality of surfaces includes a front wall having a ramped front surface and a planar front surface positioned on opposite sides of a core portion extending forwardly from the front wall.

2. The connector assembly of claim 1, wherein the core portion includes an outwardly facing first lobe joined to an outwardly facing first planar engagement surface, and an outwardly facing second lobe joined to an outwardly facing second planar engagement surface.

3. The connector assembly of claim 2, wherein the first lobe is connected by an upper planar segment of the rear portion and a first beveled edge to the second planar engagement surface.

4. The connector assembly of claim 3, wherein the second lobe is connected by a lower planar segment of the rear portion and a second beveled edge to the first planar engagement surface.

5. The connector assembly of claim 2, wherein the first planar engagement surface and the second planar engagement surface lie parallel to and spaced from the forming wall structure of the throughhole when the rear portion is inserted therethrough.

6. The connector assembly of claim 5, wherein the first planar engagement surface and the second planar engagement surface are engaged with the forming wall structure upon rotation of the connector device once the rear portion is inserted through the throughhole.

7. The connector assembly of claim 1, wherein the bolt extends through an opening in an element and through the throughhole in the base part to connect the element with the base part.

8. The connector assembly of claim 7, wherein the element is adjacent to and overlaps the connector device.

9. The connector assembly of claim 7, wherein the base part and the element are part of an exercise apparatus.

10. The connector device connecting an element to a base part via a bolt, the connector device comprising:
a body having a width extending in a lateral direction, a height extending in a vertical direction perpendicular to the lateral direction and a depth extending in a transverse direction perpendicular to the lateral direction and perpendicular to the vertical direction, the body including a rear portion integrally joined to a front portion;
the rear portion being configured to fit through a throughhole defined by a forming wall structure and formed in the base part, and the front portion being configured with a rear face for engaging an outer surface of the base part lying outside the throughhole;
the rear portion extending between upper and lower surfaces in the lateral direction, between first and second side surfaces in the vertical direction, and between front and rear walls in the transverse direction, the rear portion having a core portion extending between the front wall and rear face of the front portion, the core portion being formed with engagement surface structure for engaging the forming wall structure of the throughhole to retain the body relative to the base part when the rear portion is inserted through the throughhole and the body is rotated relative to the base part;
the body being formed with a hole extending completely through the front portion and the rear portion in the transverse direction in alignment with the throughhole for receiving the bolt and engaging the bolt in a threaded connection within the rear portion;
wherein the upper and lower surfaces and the first and second side surfaces are connected by rounded corners, and form a rectangular periphery which is sized to be inserted within a rectangular periphery of the throughhole.

11. A connector device connecting an element to a base part via a bolt, the connector device comprising:
a body having a width extending in a lateral direction, a height extending in a vertical direction perpendicular to the lateral direction and a depth extending in a transverse direction perpendicular to the lateral direction and perpendicular to the vertical direction, the body including a rear portion integrally joined to a front portion;
the rear portion being configured to fit through a throughhole defined by a forming wall structure and formed in the base part, and the front portion being configured with a rear face for engaging an outer surface of the base part lying outside the throughhole;
the rear portion extending between upper and lower surfaces in the lateral direction, between first and second side surfaces in the vertical direction, and between front and rear walls in the transverse direction, the rear portion having a core portion extending between the front wall and rear face of the front portion, the core portion being formed with engagement surface structure for engaging the forming wall structure of the throughhole to retain the body relative to the base part when the rear portion is inserted through the throughhole and the body is rotated relative to the base part;
the body being formed with a hole extending completely through the front portion and the rear portion in the transverse direction in alignment with the throughhole for receiving the bolt and engaging the bolt in a threaded connection within the rear portion;
wherein the front wall of the rear portion is formed on one side of the core portion with a planar lower front surface extending in the vertical direction, and a ramped upper front surface extending upwardly in the vertical direction and rearwardly in the transverse direction.

12. The connector device of claim 11, wherein the hole formed completely through the front portion and the rear portion includes an unthreaded access opening formed through the front portion and aligned with a threaded throughhole formed through the rear portion.

13. The connector device of claim 11, wherein the rear wall of the rear portion lies parallel to the rear face of the front portion.

14. The connector device of claim 11, wherein the front wall of the rear portion is formed on a side opposite the one side of the core portion with a planar upper front surface extending in the vertical direction, and a ramped lower front surface extending downwardly in the vertical direction and rearwardly in the transverse direction.

15. The connector device of claim 14, wherein the core portion includes an outwardly facing first lobe joined to an outwardly first planar engagement surface, and an outwardly facing second lobe joined to an outwardly facing second planar engagement surface.

16. The connector device of claim 15, wherein the first lobe has a width extending in the transverse direction which gradually decreases as it extends along the ramped upper front surface towards the first planar engagement surface.

17. The connector device of claim 16, wherein the second lobe has a width extending in the transverse direction which gradually decreases as it extends along the ramped lower front surface towards the second planar engagement surface.

18. The connector device of claim 11, wherein the rear portion is constructed with a plurality of surfaces that define a clearance space axially between the front portion and the rear portion and wherein the forming wall structure is disposed in the clearance space and axially between the front portion and the rear portion.

19. A connector device connecting an element to a base part via a bolt, the connector device comprising:
a body having a width extending in a lateral direction, a height extending in a vertical direction perpendicular to the lateral direction and a depth extending in a transverse direction perpendicular to the lateral direction and perpendicular to the vertical direction, the body including a rear portion integrally joined to a front portion;
the rear portion being configured to fit through a throughhole defined by a forming wall structure and formed in the base part, and the front portion being configured with a rear face for engaging an outer surface of the base part lying outside the throughhole;

the rear portion extending between upper and lower surfaces in the lateral direction, between first and second side surfaces in the vertical direction, and between front and rear walls in the transverse direction, the rear portion having a core portion extending between the front wall and rear face of the front portion, the core portion being formed with engagement surface structure for engaging the forming wall structure of the throughhole to retain the body relative to the base part when the rear portion is inserted through the throughhole and the body is rotated relative to the base part;

the body being formed with a hole extending completely through the front portion and the rear portion in the transverse direction in alignment with the throughhole for receiving the bolt and engaging the bolt in a threaded connection within the rear portion;

wherein the front portion includes a circular planar front face having a first diameter and the rear face has a circular shape with a diameter which is larger than the first diameter of the front face.

\* \* \* \* \*